United States Patent [19]

Suyama et al.

[11] Patent Number: 5,707,100
[45] Date of Patent: Jan. 13, 1998

[54] SUPPORT STRUCTURE FOR AUTOMOBILE BODY

[75] Inventors: Kouchi Suyama; Hidenori Esaki, both of Wako, Japan

[73] Assignee: Honda Giken Kogyo Kabushiki Kaisha, Tokyo, Japan

[21] Appl. No.: 484,128

[22] Filed: Jun. 7, 1995

[30] Foreign Application Priority Data

Oct. 21, 1994 [JP] Japan .................... 6-256919

[51] Int. Cl.⁶ .................................. B62D 25/08
[52] U.S. Cl. .................. 296/192; 296/70; 296/208; 180/90
[58] Field of Search .................. 296/194, 192, 296/208, 70; 180/90; 280/752; 454/127

[56] References Cited

U.S. PATENT DOCUMENTS

| | | | |
|---|---|---|---|
| 4,391,465 | 7/1983 | Piano | 296/194 X |
| 4,582,156 | 4/1986 | Kochy | 180/90 |
| 4,597,461 | 7/1986 | Kochy et al. | 180/90 |
| 4,909,566 | 3/1990 | Hashimoto et al. | 296/194 X |
| 4,962,961 | 10/1990 | Ito et al. | 296/194 X |
| 5,005,898 | 4/1991 | Benedetto et al. | 296/194 |
| 5,088,571 | 2/1992 | Burry et al. | 296/70 X |
| 5,358,300 | 10/1994 | Gray | 296/194 X |
| 5,364,159 | 11/1994 | Kelman et al. | 296/208 X |
| 5,387,023 | 2/1995 | Deneau | 296/194 X |
| 5,549,344 | 8/1996 | Nishijima et al. | 296/70 |
| 5,556,153 | 9/1996 | Kelman et al. | 296/192 X |

FOREIGN PATENT DOCUMENTS

| | | |
|---|---|---|
| 59-206267 | 11/1984 | Japan . |
| 60-50078 | 3/1985 | Japan . |
| 2303978 | 12/1990 | Japan . |

OTHER PUBLICATIONS

English language Abstract of JP 2-303978.

*Primary Examiner*—Joseph D. Pape
*Attorney, Agent, or Firm*—Lyon & Lyon LLP

[57] ABSTRACT

A frame member for the front of the interior of an automobile is in the form of a casting and has a cross-sectional shape with an opening which opens at least downwardly. The frame member has, integrally formed therewith, a steering component support, an air-conditioner support and structural section, and an ECU support and structural section. The frame member also has an electrical harness passage and an air bag inflator module attachment disposed on an upper portion thereof.

28 Claims, 15 Drawing Sheets

SUPPORT STRUCTURE FOR AUTOMOBILE BODY

BACKGROUND OF THE INVENTION

1. Field of the Invention

The present invention relates to a support structure for a front portion of an automobile body.

2. Description of the Related Art

It has generally been customary to install various automobile components including an air-conditioner, an ABS, an engine control ECU, an EAT, pillar pipes, ducts, and an instrument panel successively into an automobile body. Therefore, a large number of steps have been required to assemble these components in the automobile body, and hence assembling these components in the automobile body has been considerably complex and time-consuming.

If an assembly unit composed of the above components that have already been assembled is prepared and installed in an automobile body, then the number of steps needed to install the components is greatly reduced, and the process of installing the components in the automobile body is simplified and made efficient.

According to a known process, a structural unit is produced by attaching various unit constituents including a box, a steering system, and an air-conditioner to a dashboard and a transverse support member that can be attached to and detached from an automobile body, and then the structural unit is brought downwardly into the automobile body for installation (see Japanese laid-open patent publication Nos. 59-206267 and 60-50078).

Furthermore, as disclosed in Japanese laid-open patent publication No. 2-303978, there has been known an automobile body front structure which is produced by separating a rear cowl member from a front portion of an automobile body while leaving a major cowl component in the front portion of the automobile body, installing fittings including an instrument panel on the separated cowl member thereby producing an assembly unit, and then joining the assembly unit to the major cowl component.

In any of the above conventional arrangements, however, various heavy components including the ECU, the air-conditioner, etc. are mounted on a frame member such as the transverse support member or the cowl member. Therefore, the frame member itself is also heavy because it needs to be sufficiently rigid and large in thickness to support the heavy components.

Many different dedicated brackets are used to install the respective components on the frame member. Consequently, many different devices are required to manufacture such dedicated brackets, whereby it is complex and costly to manufacture the dedicated brackets.

SUMMARY OF THE INVENTION

It is an object of the present invention to provide a support structure for an automobile body, which can be manufactured by a simplified process and at a low cost, by reducing the number of component attachments such as brackets.

Another object of the present invention is to provide a support structure for an automobile body, which is simple in structure and can easily be serviced for maintenance.

Still another object of the present invention is to provide a support structure for an automobile body, which is lightweight, has a desired degree of rigidity, and can be worked upon efficiently.

According to the present invention, there is provided a support structure for an automobile body, comprising a frame member extending transversely of a front portion of the automobile body and fixed to opposite side members of the front portion, the frame member having a cross-sectional shape having an opening which opens at least downwardly, and the frame member having an air-conditioner casing integral therewith for supporting air-conditioner parts directly in the opening.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
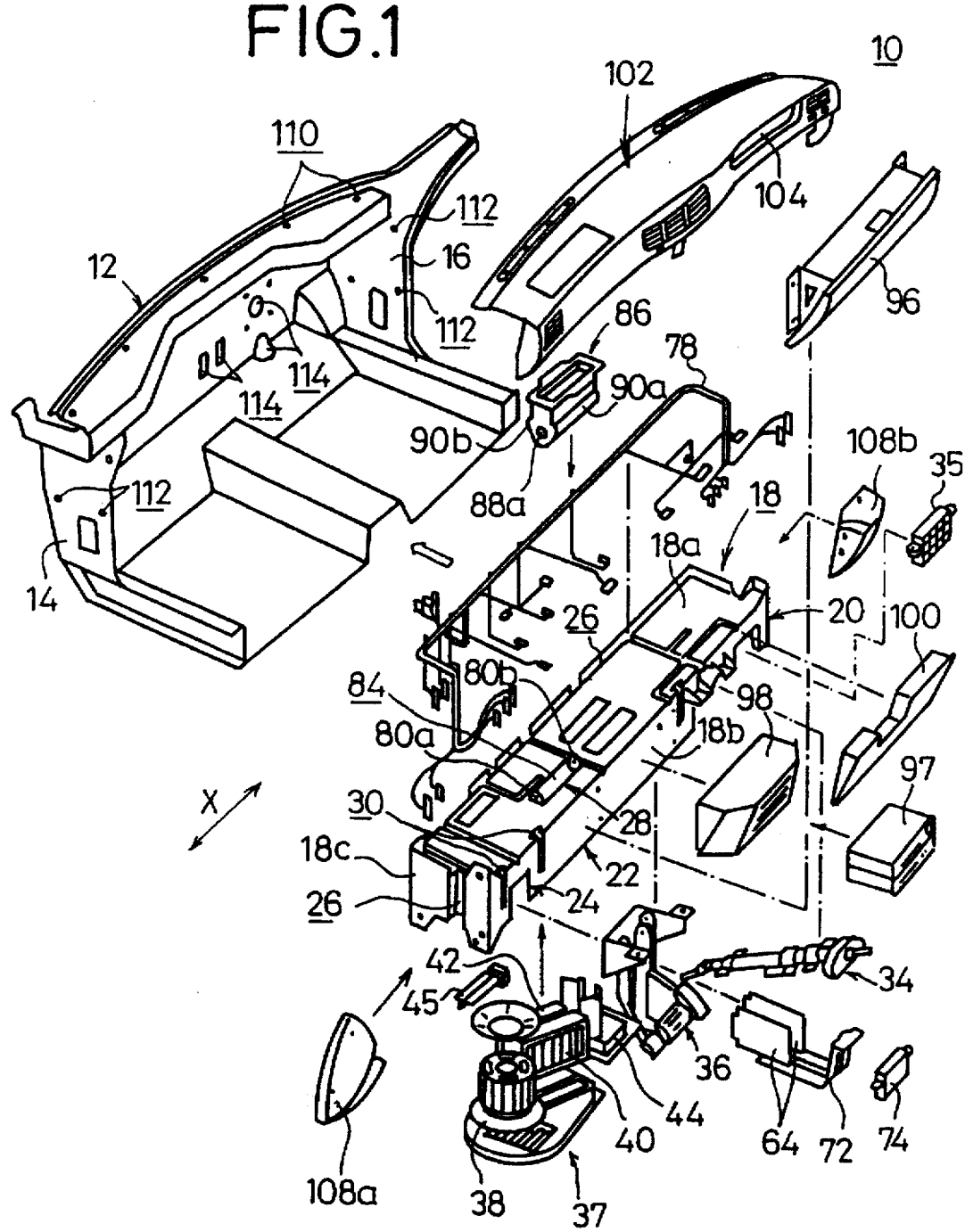
FIG. 1 is an exploded perspective view of a support structure for an automobile body according to an embodiment of the present invention.

As shown in FIG. 1, a support structure, generally denoted by the reference numeral 10, for an automobile body according to an embodiment of the present invention has a frame member 18 extending transversely in the direction indicated by the arrow X between and fixed to side members (so-called A pillars) 14, 16 of a front portion 12 of an automobile body.

The frame member 18 is cast of a light alloy such as aluminum or magnesium, for example. The frame member 18 is shown upside down in FIG. 2. It can be seen from FIG. 2 that the frame member 18 is of a cross-sectional shape which opens at least downwardly.

Figure 2:
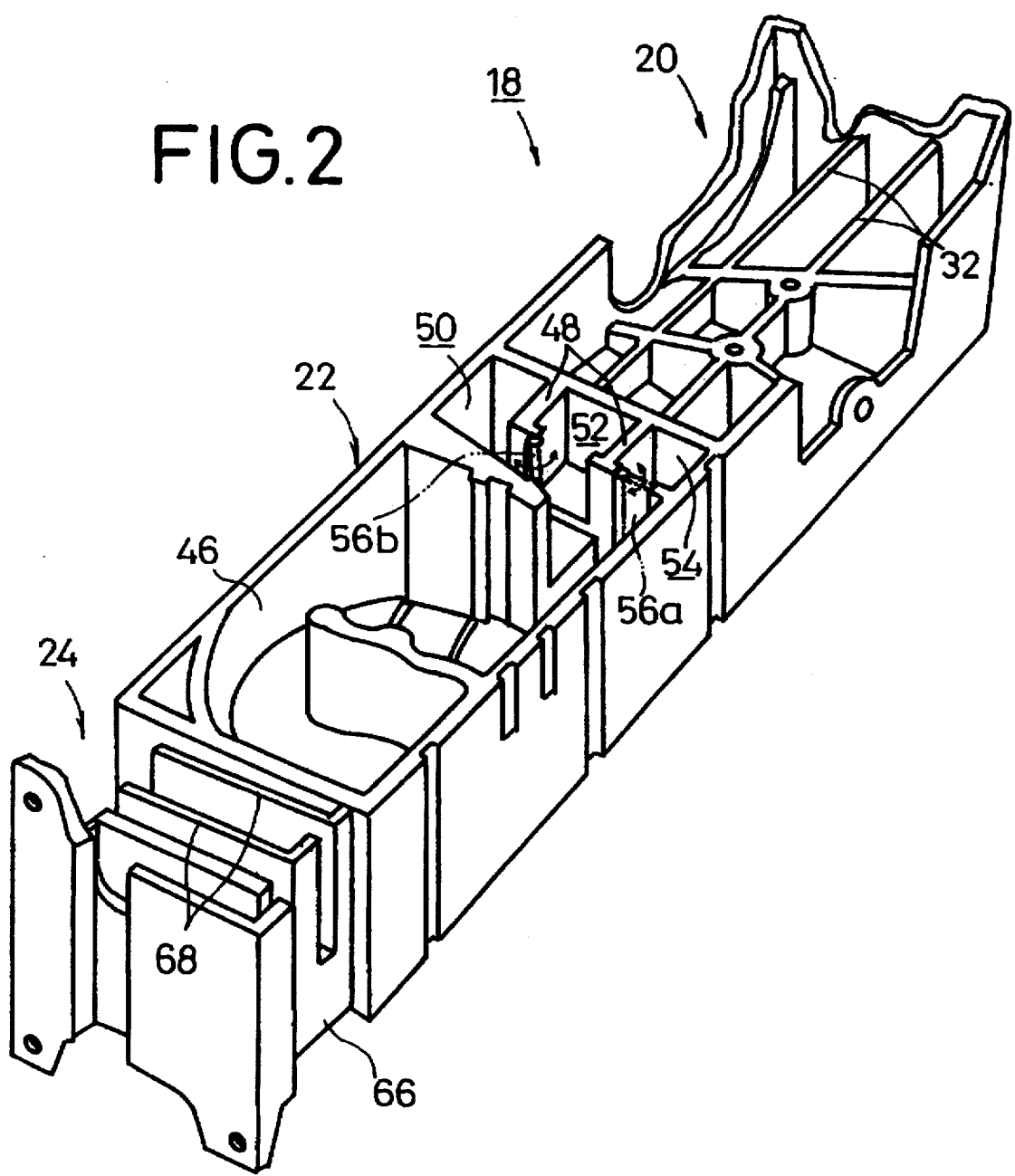
FIG. 2 is a perspective view of a frame member, shown upside down, of the support structure.
Figure 3:
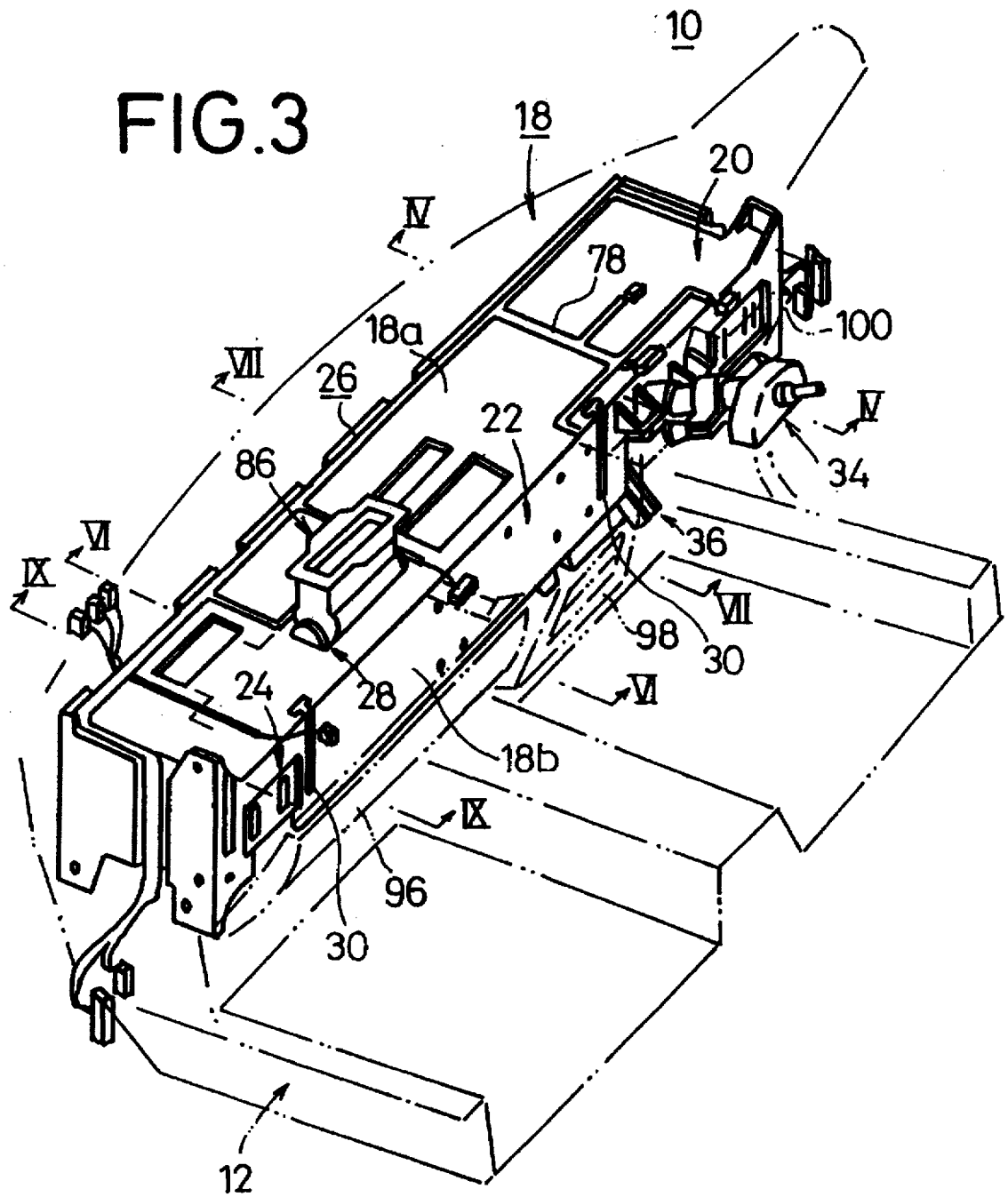
FIG. 3 is a perspective view of the support structure.

As shown in FIGS. 1 through 3, the frame member 18 has, integrally formed therewith, a steering component support 20, an air-conditioner structural section 22, and an ECU structural section 24. The frame member 18 also has a harness passage 26 and an air bag inflator module attachment 28 disposed on an upper portion 18a thereof. A plurality of vertical grooves 30 for attaching various boxes (described later on) are defined in a vertical longitudinal side panel 18b of the frame member 18 which faces the interior of the passenger's compartment of the automobile body.

Figure 4:
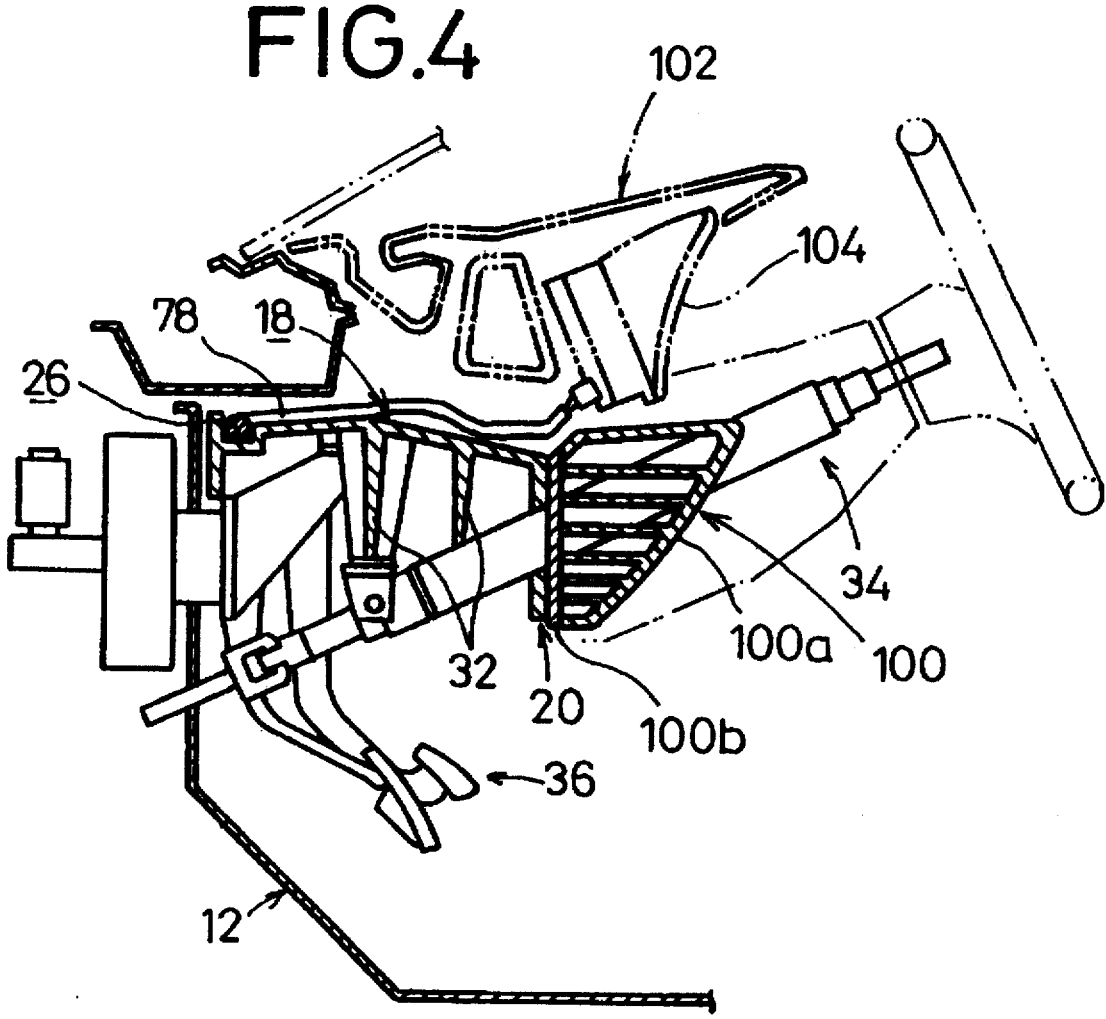
FIG. 4 is a cross-sectional view taken along line IV—IV of FIG. 3.

As shown in FIGS. 2 and 4, the steering component support 20 has a plurality of stiffening ribs 32 along which a steering component 34 is directly mounted on the frame member 18. A pedal component 36 is mounted on the frame member 18 inwardly of the steering component support 20. A fuse box 35 (see FIG. 1) is fixed to a front side of the steering component support 20.

As shown in FIGS. 1, 2, 5, and 7, the air-conditioner structural section 22 has an air-conditioner casing 46 for accommodating therein components of an air conditioner 37, i.e., a blower fan 38, an heat exchange evaporator 40, a heat exchange core 42, a damper unit 44 for selecting air discharge ports, and a damper unit 45 for drawing external air, which can directly be brought into the air-conditioner casing 46 from the open side of the frame member 18. The air-conditioner structural section 22 also has a plurality of vertical partitions 48 integral therewith.

Figure 5:
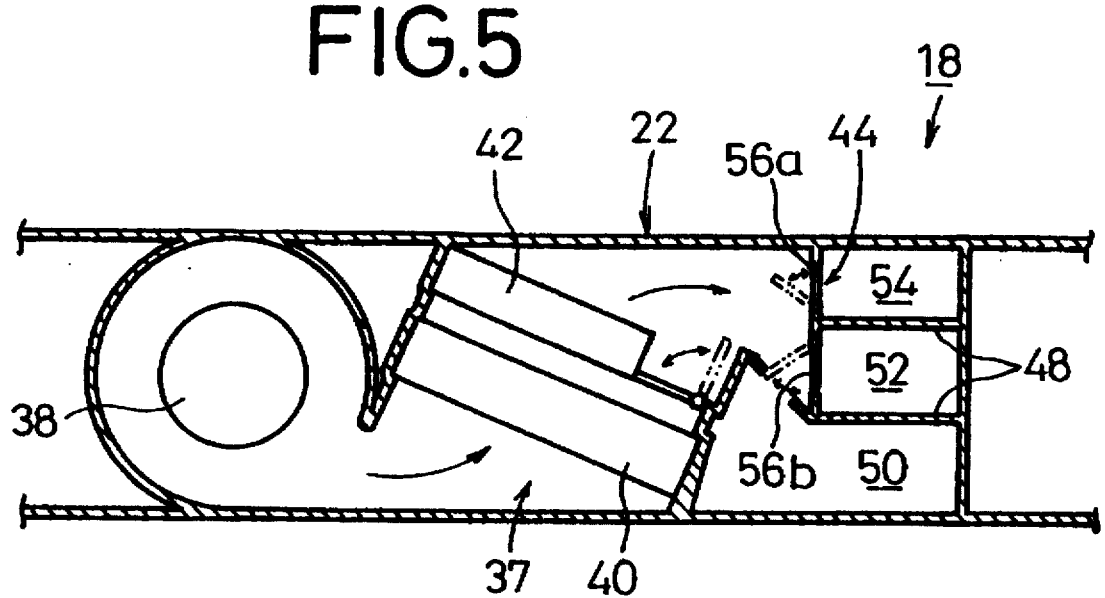
FIG. 5 is a sectional plan view of the frame member with an air-conditioner mounted therein.
Figure 7:
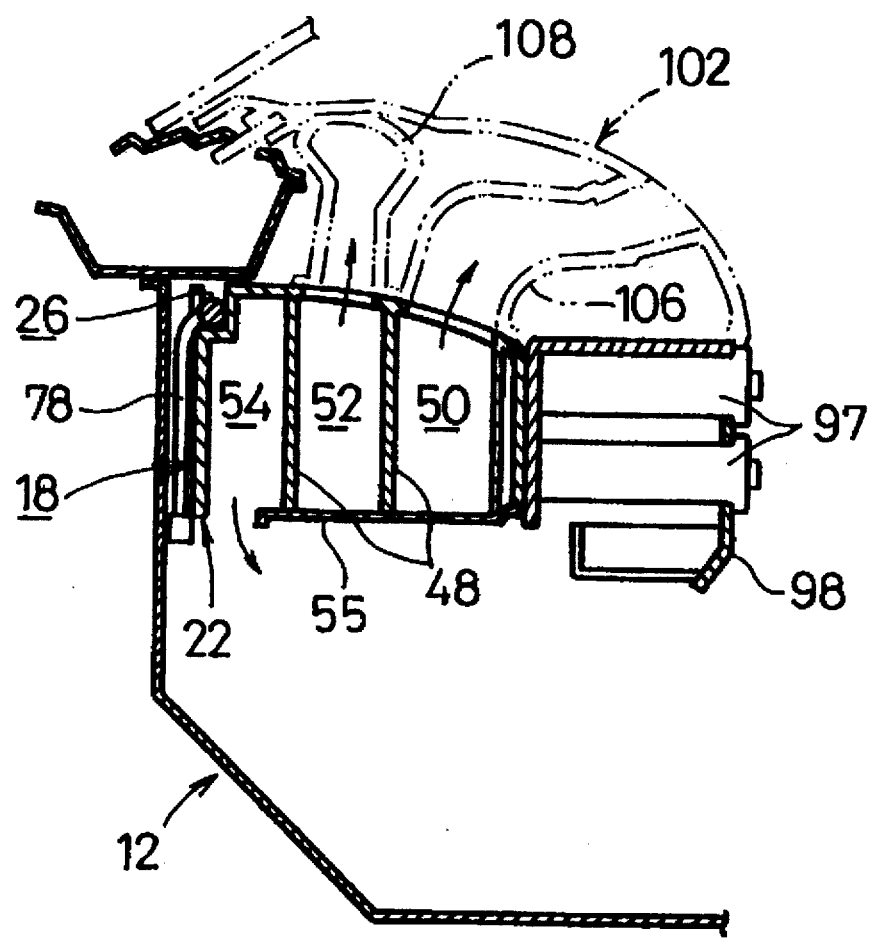
FIG. 7 is a cross-sectional view taken along line VII—VII of FIG. 3.

As shown in FIGS. 2, 5, and 7, the vertical partitions 48 define therebetween a first air passage 50 for discharging air into a front space of the passenger's compartment, a second air passage 52 for discharging defrosting air, and a third air passage 54 for discharging air into a foot space of the passenger's compartment. The second and third air passages 52, 54 are closed by a lid 55 (see FIG. 7) fixed to the lower side of the frame member 18. In FIG. 5, the air-conditioner 37 is shown installed in the frame member 18.

Figure 8:
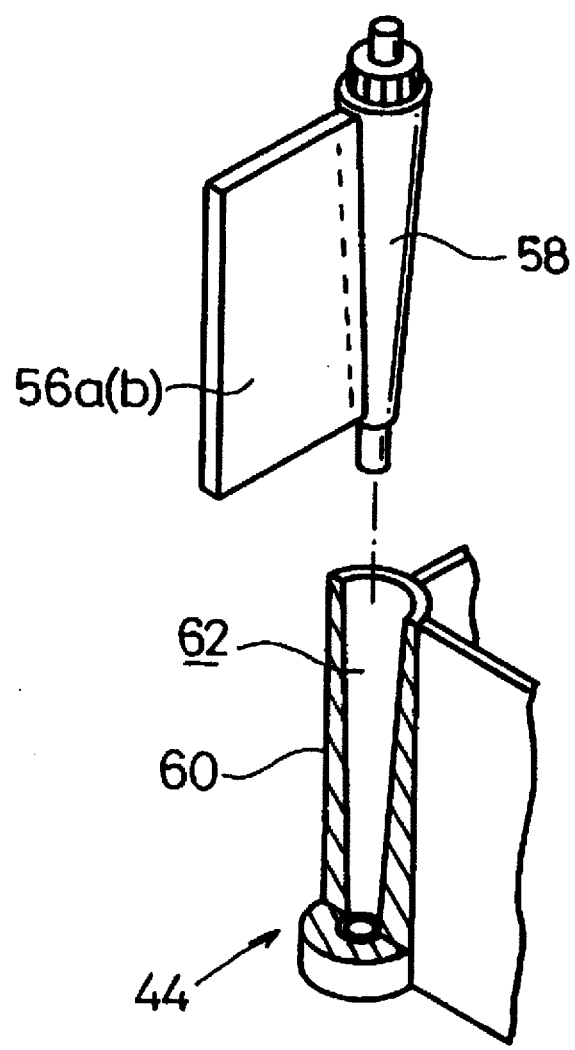
FIG. 8 is a fragmentary perspective view, partly broken away, of a damper unit of the air-conditioner.

The damper unit 44 has a pair of swingable dampers 56a, 56b for selecting the first, second, and third air passages 50, 52, 54. As show in FIG. 8, each of the dampers 56a, 56b has a downwardly tapered shaft 58 which is angularly movably supported by a support 60 that has a downwardly tapered hole 62 defined therein complementarily to the shaft 58. The shafts 58 of the dampers 56a, 56b can thus easily be placed into the respective supports 60. Therefore, the damper unit 44 is relatively lightweight and can easily be assembled.

Figure 9:
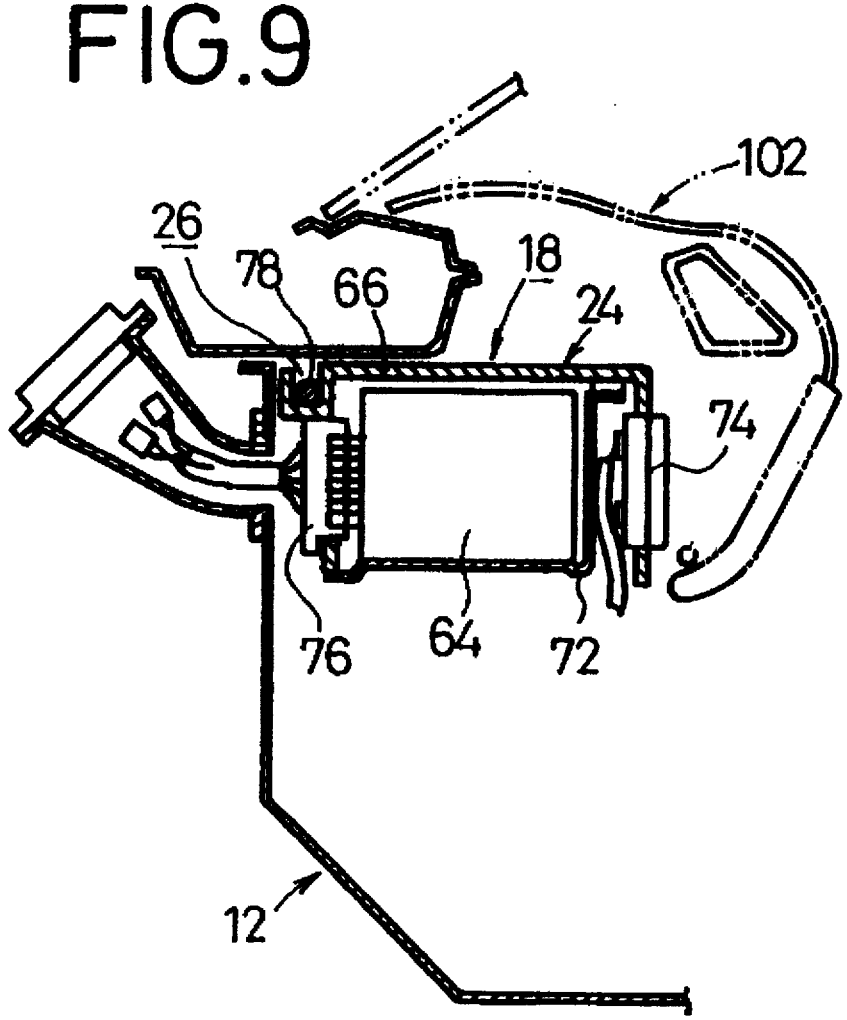
FIG. 9 is a cross-sectional view taken along line IX—IX of FIG. 3.
Figure 10:
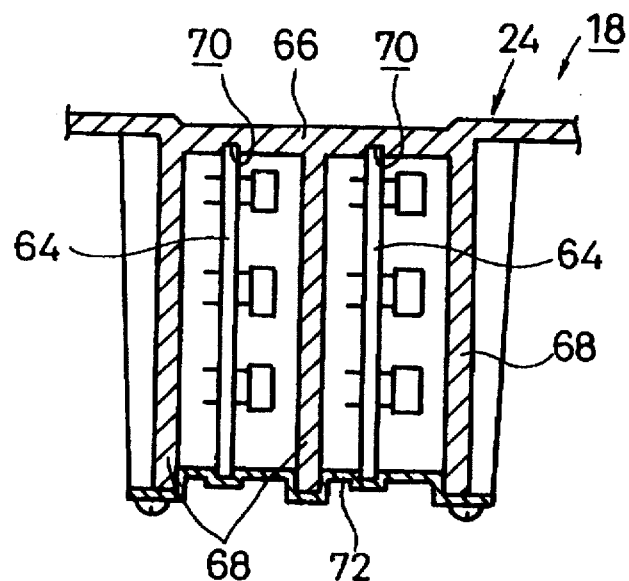
FIG. 10 is a vertical cross-sectional view of an ECU structural section of the frame member.

As shown in FIGS. 2 and 9, the ECU structural section 24 has an integral board isolating casing 66 in which various control boards 64 are directly positioned. As shown in FIG. 10, the casing 66 has a plurality of isolating partitions 68 and a plurality of slots 70 alternating therewith for insertion therein of the respective control boards 64. When inserted, the control boards 64 are fixed to the casing 66 by a lid plate 72 and connectors 76, and a connection box 74 is fixed to the lid plate 72 (see FIG. 9).

A harness 78 that is connected to various electric components, the fuse box 35, and the connectors 76, is inserted downwardly (or upwardly) into the passage 26 of the frame member 18. The passage 26 is formed at the same time the frame member 18 is cast, and has cavities and recesses. As shown in FIG. 1, the passage 26 has ends extending vertically in opposite end surfaces 18c of the frame member 18 such that the harness 78 in the passage 26 can extend into door openings on the automobile body.

Figure 11:
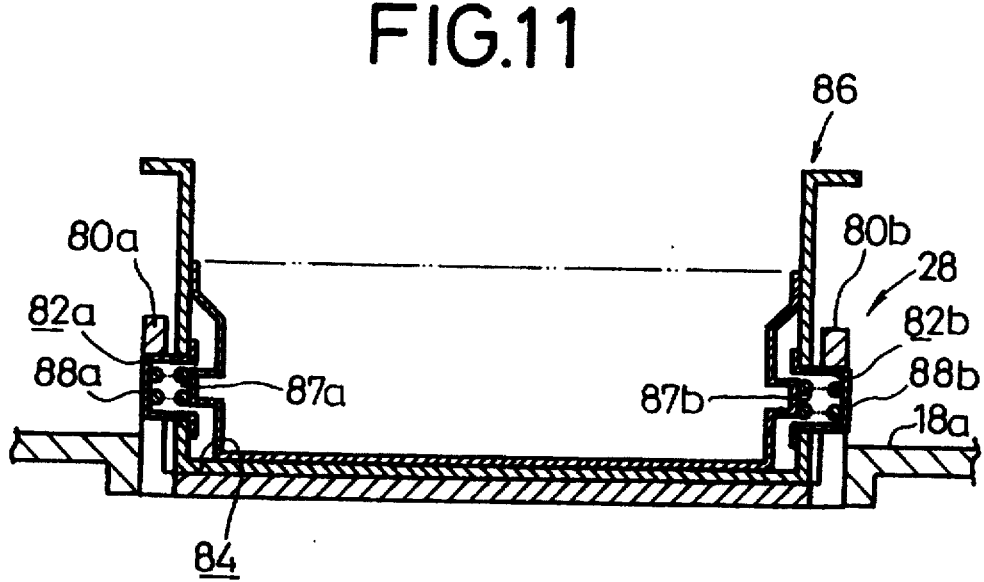
FIG. 11 is a vertical cross-sectional view of an air bag inflator module attachment of the frame member.

As shown in FIGS. 1 and 11, the air bag inflator module attachment 28 has a pair of spaced circular attachment plates 80a, 80b projecting upwardly from the upper portion 18a of the frame member 18, which plates have respective holes 82a, 82b defined therein. The air bag inflator module attachment 28 also has a cylindrical cavity 84 defined between the circular attachment plates 80a, 80b, and an air bag inflator module 86 is placed in the cavity 84.

The air bag inflator module 86 has a cylindrical lower portion complementary to the cylindrical cavity 84 and having clip members 88a, 88b (see FIG. 11) supported on respective opposite ends thereof and biased by respective springs 87a, 87b. When the clip members 88a, 88b are inserted into the respective holes 82a, 82b in the circular attachment plates 80a, 80b, the clip members 88a, 88b are resiliently retained in the respective holes 82a, 82b under the forces of the springs 87a, 87b, thus installing the air bag inflator module 86 in the air bag inflator module attachment 28. The air bag inflator module 86 also has a pair of protrusions 90a, 90b (see FIG. 1) on respective opposite lower sides thereof. When the protrusions 90a, 90b are held against the upper portion 18a of the frame member 18, the air bag inflator module 86 is placed at a certain angle on the upper portion 18a of the frame member 18.

Figure 12:
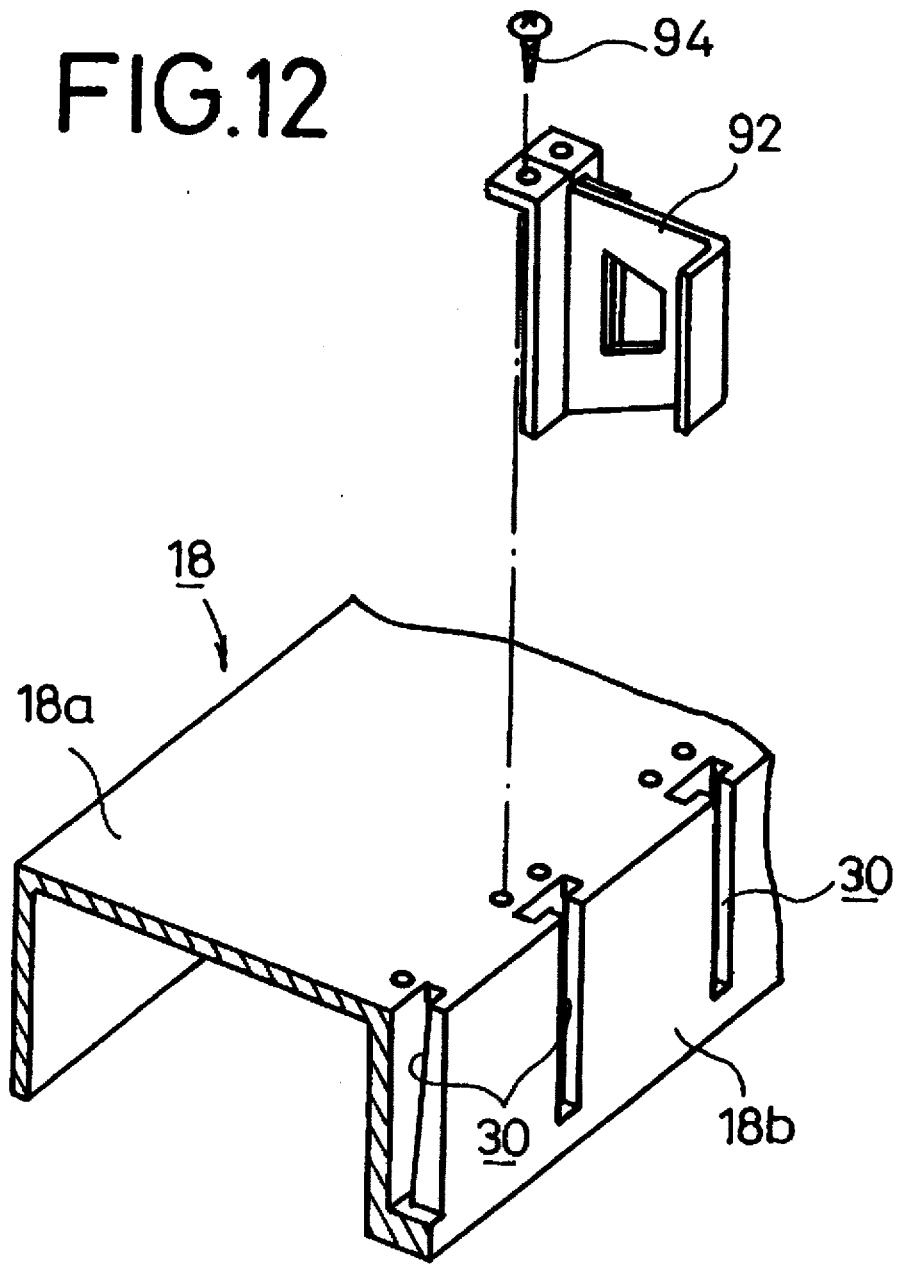
FIG. 12 is an exploded fragmentary perspective view showing grooves in the frame member and an attachment.

As shown in FIG. 12, each of the vertical grooves 30 in the vertical longitudinal side panel 18b of the frame member 18 is tapered from the upper portion 18a of the frame member 18 downwardly to a certain depth, and has a substantially T-shaped horizontal cross section. When a component attachment 92 is inserted into each of the vertical grooves 30, it is fastened to the frame member 18 by self-tapping screws 94. As shown in FIG. 1, a glove box 96, a center console 98 incorporating an audio component set 97, a driver knee bolster 100, and an instrument panel 102 are installed on the respective attachments 92.

Figure 13:
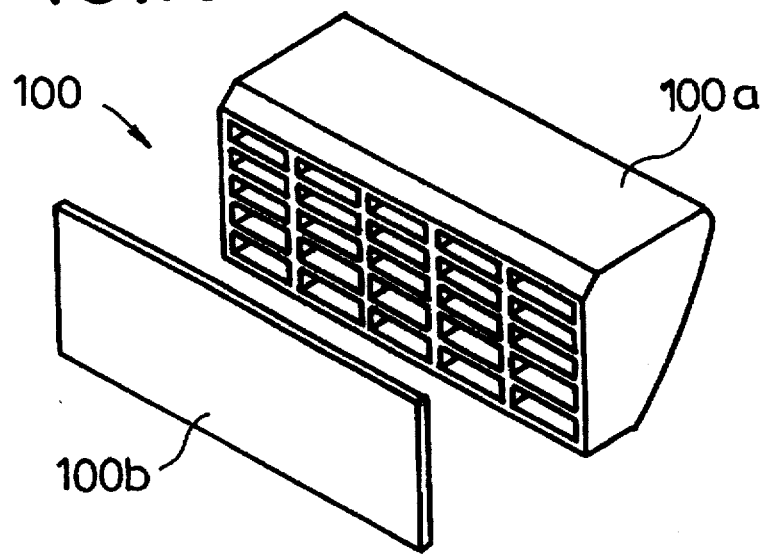
FIG. 13 is an exploded fragmentary perspective view of a driver knee bolster.

As shown in FIGS. 4 and 13, the driver knee bolster 100 has comprises a housing 100a having a shock-absorbing rib structure and a panel 100b bonded or fused to the housing 100a. The panel 100b of the driver knee bolster 100 is secured directly to the frame member 18. Since the panel 100b is secured directly to the frame member 18, it does not require any attachment plate which would otherwise be needed by a conventional driver knee bolster composed of pipe members.

Figure 6:
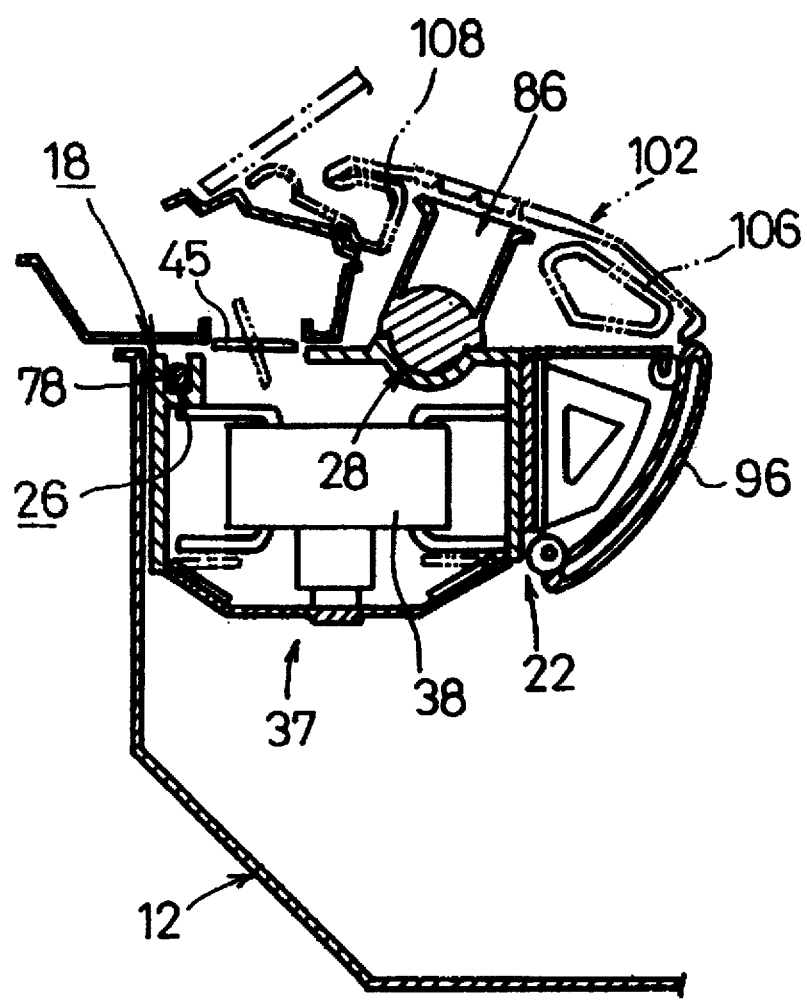
FIG. 6 is a cross-sectional view taken along line VI—VI of FIG. 3.

On the instrument panel 102, there are mounted meters 104 (see FIG. 1), a front duct 106 communicating with the first air passage 50, and a defroster duct 108 (see FIGS. 6 and 7) communicating with the second air passage 52. As illustrated in FIG. 1, side covers 108a, 108b are attached to the respective opposite ends of the instrument panel 102.

As shown in FIG. 1, the front portion 12 of the automobile body has holes 110 defined therein for attachment of the instrument panel 102, holes 112 defined therein for attachment of the frame member 18, and various other holes 114 defined therein. The frame member 18 with the various components mounted thereon has its opposite ends held against the side members 14, 16 of the front portion 12 and fastened to the side members 14, 16 by bolts (not shown) that extend through holes 112 in the direction indicated by the arrow X.

In the support structure 10 thus arranged, the steering component support 20, the air-conditioner structural section 22, and the ECU structural section 24 are integrally formed with the frame member 18. The air-conditioner structural section 22 has the casing 46 for placing directly therein the components of the air-conditioner 37, i.e., the blower fan 38, the evaporator 40, the heater core 42, the damper unit 44 for selecting air discharge ports, and the damper unit 45 for drawing external air. The opening of the frame member 18 is large in order to accommodate these components of the air-conditioner 37, and the frame member 18 is of a reduced wall thickness while maintaining a desired degree of rigidity. This allows the frame member 18 to provide a large space availability and to have a reduced weight with ease.

Since the frame member 18 has the air-conditioner casing 46, no separate dedicated casing for the air-conditioner 37 is necessary. The frame member 18 also has the board isolating casing 66 of the ECU structural section 24. Consequently, the number of parts of the support structure 10 is relatively small, and the support structure 10 may be lightweight and small in size as a whole.

The frame member 18 is open downwardly, and the vertical partitions 48 of the air-conditioner structural section 22 extend vertically. With the frame member 18 fixed to the front portion 12 of the automobile body, the blower fan 38, the evaporator 40, the heater core 42, the damper unit 44, and the damper unit 45 can easily be detached from below the frame member 18. The various parts can thus be serviced quickly and easily through the opening of the frame member 18 from below the frame member 18.

The passage 26 is defined in the upper portion 18a of the frame member 18, and the harness 78 is installed downwardly or upwardly into the passage 26. Therefore, the harness 78 can easily be fitted into the passage 26, and, once installed, requires no protector for protection against damage by the frame member 18 and other components.

The air bag inflator module 86 can simply be installed on the frame member 18 while on an automobile assembly line. The angle at which the air bag inflator module 86 is placed on the frame member 18 can easily be selected simply by varying the shape of the protrusions 90a, 90b on the lower opposite sides of the air bag inflator module 86. The air bag inflator module 86 is therefore versatile in use.

Inasmuch as the frame member 18 is in the form of a casting, the frame member 18 can be formed more easily and inexpensively than it would be formed by pressing.

The vertical longitudinal side panel 18b of the frame member 18 has a rough cast surface which would be required to be machined subsequent to casting if the glove box 96, the center console 98, etc. were to be directly attached to the vertical longitudinal side panel 18b. According to this embodiment, the grooves 30 extending downwardly to a certain depth are defined in the vertical longitudinal side panel 18b at the same time the frame member 18 is cast, and the glove box 96, the center console 98, etc. are supported on the vertical longitudinal side panel 18b by the attachments 92 inserted in the respective grooves 30. Therefore, the vertical longitudinal side panel 18b is not required to be machined subsequent to casting. The frame member 18 is thus relatively inexpensive. The attachments 92 inserted in the grooves 30 are positioned and firmly secured in position by side and bottom surfaces of the grooves 30 and screws 94, as shown in FIG. 12.

Figure 14:
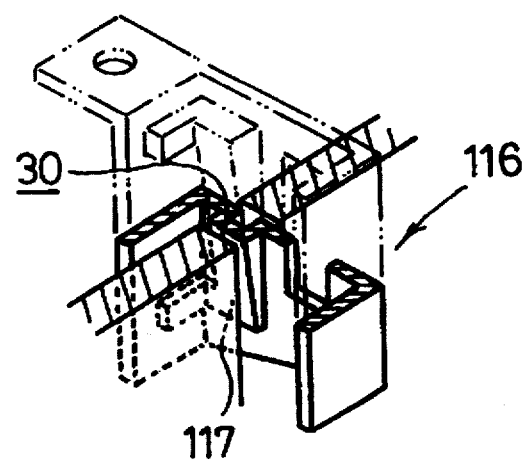
FIG. 14 is a perspective view of another attachment.

The attachments 92 may be replaced with attachments 116 shown in FIG. 14. As shown in FIG. 14, each of the attachments 116 has a tapered step 117 which is fitted in one of the grooves 30 for thereby positioning the attachment 116 in the transverse and longitudinal directions of the automobile body.

Figure 15:
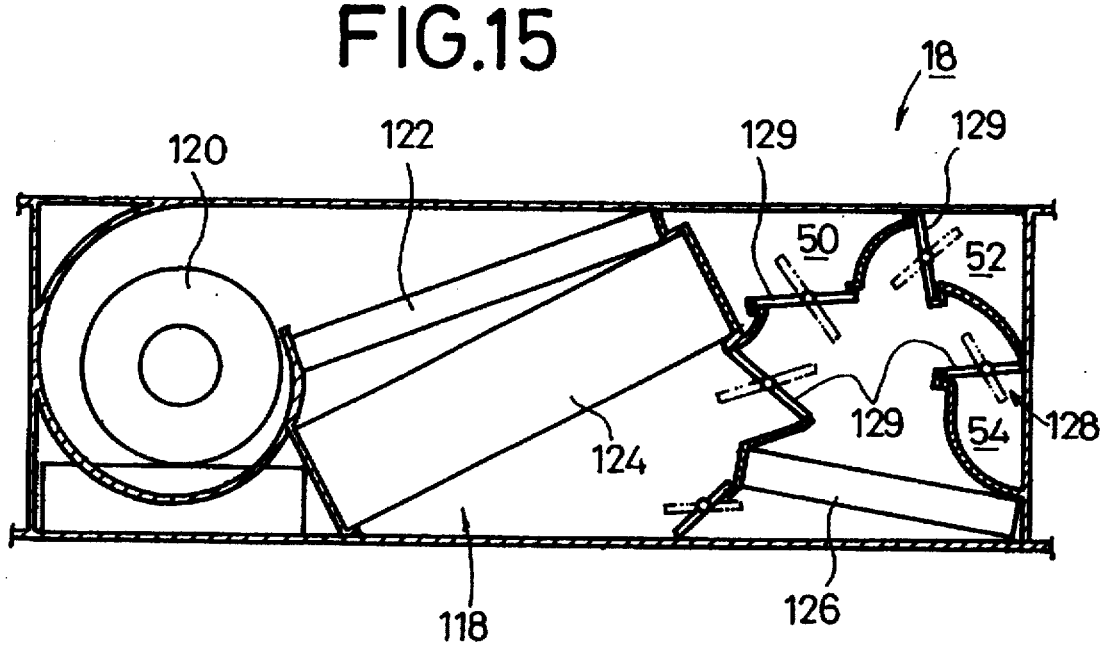
FIG. 15 is a vertical cross-sectional view of another air conditioner structural section of the frame member.

The air-conditioner shown in FIG. 5 may be replaced with an air-conditioner 118 shown in FIG. 15. The air-conditioner 118 has a blower fan 120, an air filter 122, an heat exchange evaporator 124, a heat exchange heater core 126, and a damper unit 128 for selecting air discharge ports, the damper unit 128 having a plurality of swingable dampers 129.

The air filter 122, the evaporator 124, the heater core 126, and the damper unit 128 can easily be removed from below the frame member 18 for efficient maintenance.

In this embodiment, the frame member 18 is fastened to the side members 14, 16 of the front portion 12 of the automobile body by bolts (not shown) oriented in the direction indicated by the arrow X in FIG. 1. However, the frame member 18 may be fastened to the side members of the front portion of the automobile body by other fastening structures.

Figure 16:
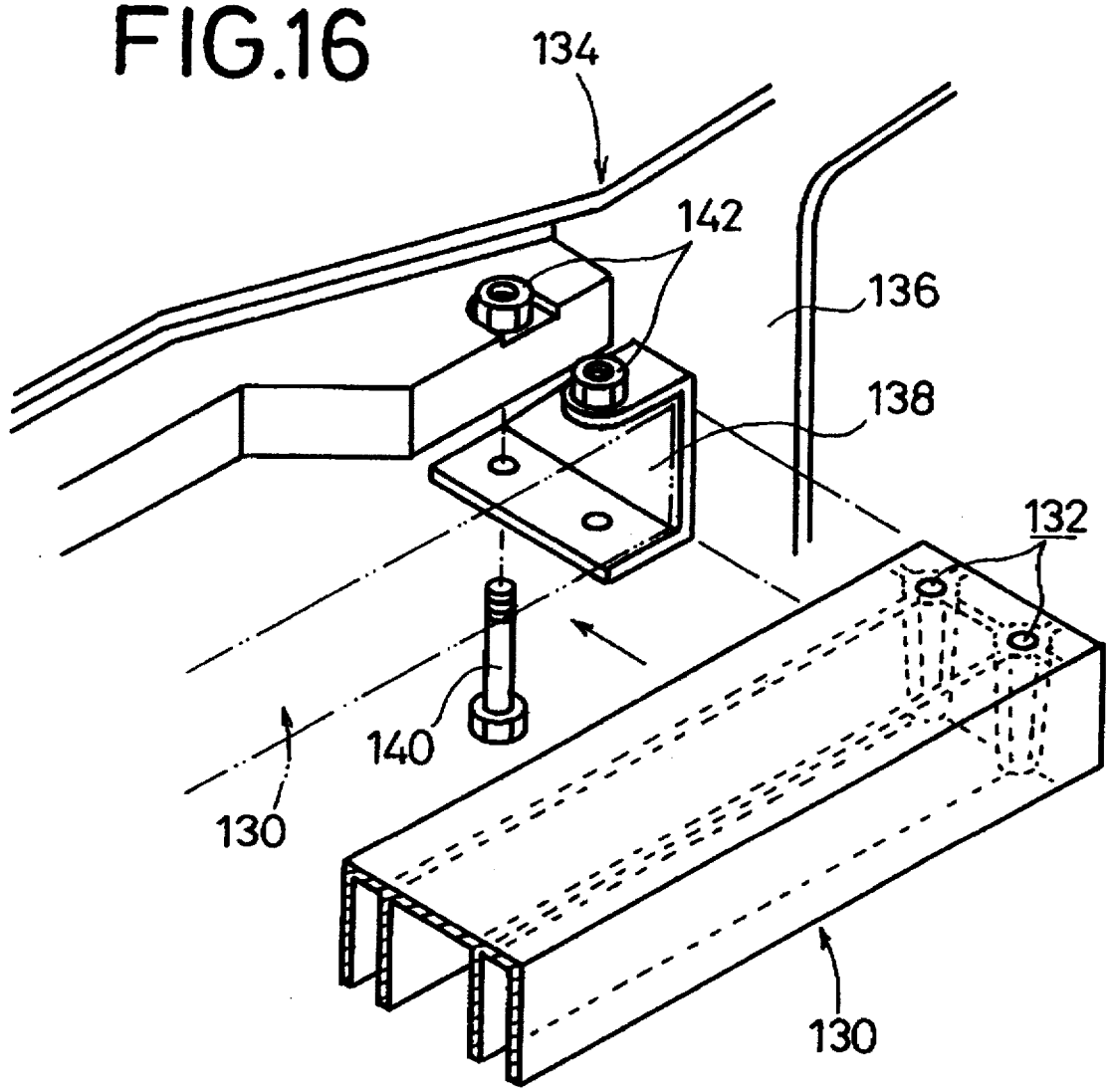
FIG. 16 is a fragmentary perspective view of another structure by which the frame member is fixed to a front portion of an automobile body.

For example, as shown in FIG. 16, a frame member 130 similar to frame member 18 has vertical bolt insertion holes 132 defined in each of opposite ends thereof, and a channel-shaped bracket 138 is attached to each of opposite side members 136 of a front portion 134 of an automobile body.

For installation, the frame member 130 is fitted into the brackets 138 from within the passenger's compartment of the automobile body, and then bolts 140 are inserted upwardly through the brackets 138 and the bolt insertion holes 132. Nuts 142 are then threaded and tightened over the respective tip ends of the bolts 140, thereby fastening the frame member 130 to the front portion 134 of the automobile body.

The frame member 130 can be fastened efficiently to the brackets 138 because the frame member 130 is supported on lower arms of the brackets 138 when the bolts 140 are inserted and tightened. Even if an instrument panel (not shown) is attached as a module to the frame member 130, the frame member 130 is installed with ease because the frame member 130 is fastened with the bolts 140 inserted from below. Since the bolt insertion holes 132 can be formed in the frame member 130 at the same time the frame member 130 is cast, any subsequent machining on the frame member 130 may be simplified.

Figure 17:
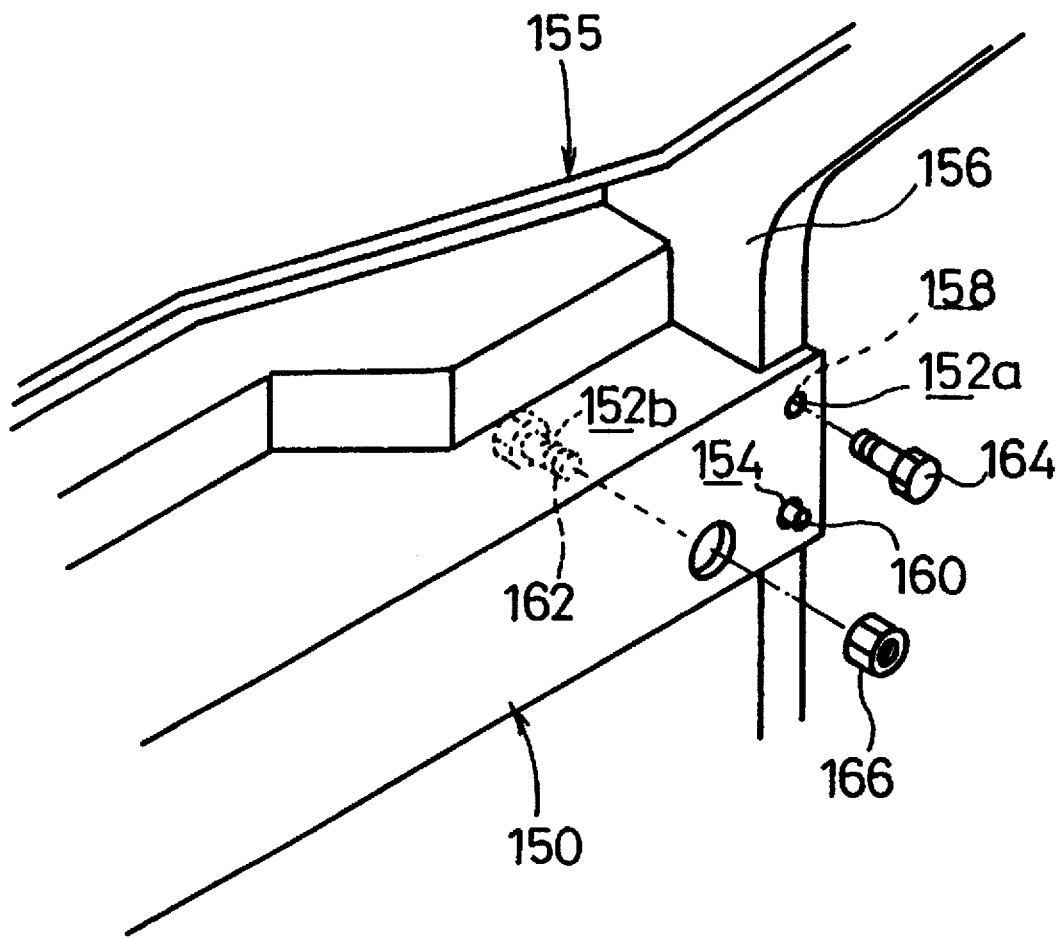
FIG. 17 is a fragmentary perspective view of still another structure by which the frame member is fixed to a front portion of an automobile body.

FIG. 17 shows still another frame member 150 similar to frame member 18 having bolt insertion holes 152a, 152b and a hole 154 that are defined in each of opposite ends thereof, with the holes 152a, 152b, 154 having axes oriented in the longitudinal direction of an automobile body. The automobile body includes a front portion 155 having opposite side members 156 each with a threaded hole 158 and a guide pin 160 whose axes are also oriented in the longitudinal direction of the automobile body. A stud bolt 162 is mounted on a dashboard close to each of the side members 156.

To install the frame member 150 on the front portion 155, the guide pins 160 on the side members 156 are fitted in the respective holes 154 in the frame member 150, and then bolts 164 are inserted into the respective bolt insertion holes 152a and threaded into the respective threaded holes 158. The stud bolts 162 are inserted into the respective bolt insertion holes 152b, and nuts 166 are threaded and tightened over the respective tip ends of the stud bolts 162, thereby fastening the frame member 150 to the front portion 155 of the automobile body.

The support structure for an automobile body according to the present invention offers the following advantages:

Since the frame member has the air-conditioner casing integrally therewith, the cross-sectional area of the opening of the frame member is large, and is of a reduced wall thickness while maintaining a desired degree of rigidity. This allows the frame member to have a reduced weight with ease. Since the frame member has the air-conditioner casing, no separate dedicated casing for the air-conditioner is necessary. Consequently, the number of parts of the support structure is relatively small, and the support structure may be lightweight and small in size as a whole. With the frame member fixed to the front portion of the automobile body, the various parts on the frame member can be serviced quickly and easily through the opening of the frame member from below the frame member, and maintenance of the parts is simplified.

Although certain preferred embodiments of the present invention have been shown and described in detail, it should be understood that various changes and modifications may be made therein without departing from the scope of the appended claims.

What is claimed is:

1. A support structure for an automobile body, comprising:
    a frame member or extending transversely across a front portion of the automobile body and being fixed to opposite side members of the front portion;
    said frame member having a cross-sectional shape having an opening which opens downwardly; and
    said opening defining an air-conditioner casing integral with said frame member for supporting separate air-conditioner parts including at least a fan unit directly in said opening.

2. A support structure according to claim 1, wherein said frame member comprises a casting.

3. A support structure according to claim 1, wherein said frame member has a vertical partition integral therewith which defines an air-conditioner air passage.

4. A support structure according to claim 1, wherein said frame member has a passage defined in an upper portion thereof for installing therein a harness for connection to electric components.

5. A support structure according to claim 1, wherein said frame member has a board isolating casing integral therewith for inserting control boards directly therein.

6. A support structure according to claim 5, wherein said board isolating casing has a plurality of isolating partitions and a plurality of slots alternating therewith for insertion in said slots of said control boards, respectively.

7. A support structure according to claim 1, wherein said frame member has a plurality of ribs integral therewith for supporting a steering component directly thereon.

8. A support structure according to claim 1, wherein said frame member has a cavity defined therein for placing an air bag inflator module at a given angle on the frame member, and an attachment integral therewith for holding said air bag inflator module.

9. A support structure according to claim 1, wherein said frame member has a plurality of vertical grooves defined therein for installing respective attachments thereon.

10. A support structure according to claim 9, wherein said grooves are of a downwardly tapered shape.

11. A support structure according to claim 1, further comprising fixing means for fixing said frame member to side members of the front portion of the automobile body with bolts extending transversely of the automobile body.

12. A support structure according to claim 1, further comprising fixing means for fixing said frame member to side members of the front portion of the automobile body with vertically extending bolts.

13. A support structure according to claim 1, further comprising fixing means for fixing said frame member to side members of the front portion of the automobile body with bolts extending longitudinally of the automobile body.

14. A support structure according to claim 1, further comprising an instrument panel mounted on said frame member.

15. A support structure for the front portion of the interior of an automobile body, comprising:
    a frame member or extending transversely across the entire front portion and being fixed to opposite side members of the front portion;
    said frame member having a substantially rectangular cross-sectional shape; and
    said frame member having a plurality of sections spaced along said frame member in the transverse direction of the automobile body, each of said sections opening downwardly from a bottom side of said frame member and having a shape and structure for receiving and supporting different operating components of the automobile.

16. A support structure according to claim 15, wherein said frame member comprises a casting.

17. A support structure according to claim 15, wherein said frame member has at least one said downwardly facing opening that allows installation and removal of said operating component from that said section with said frame member fixed in the automobile.

18. A support structure according to claim 17, operating component for being installed and removed is an air-conditioning component and said at least one said section forms an air-conditioning casing.

19. A support structure according to claim 17, wherein said operating component for being installed and removed are computer control boards.

20. A support structure according to claim 19, wherein said section for being control boards has a plurality of isolating partitions and a plurality of slots between said partitions for insertion of said control boards.

21. A support structure according to claim 15, wherein one said section of said frame member has a plurality of ribs integral therewith for attaching and supporting a steering component directly thereon.

22. A support structure according to claim 15, wherein said sections of said frame member receive and support, separately, operating components including an air-conditioner, ECU control boards, a steering mechanism, and an electric wiring harness.

23. A support structure according to claim 15, wherein said frame member has a plurality of vertical grooves defined on a vertical surface facing rearwardly of the automobile for installing respective attachments on said frame member.

24. A support structure according to claim 23, wherein said grooves are of a downwardly tapered shape.

25. A support structure according to claim 15, further comprising an instrument panel mounted on an upper surface of said frame member.

26. A support structure according to claim 15, wherein said plurality of sections include spaces of shapes and structures for receiving separate operating parts of an air-conditioner including a fan unit, a heater core, an evaporator and dampers for controlling air flow from said fan unit to said heater core and said evaporator.

27. A support structure according to claim 1, wherein said separate air-conditioner parts include a heat exchanger supported in said opening.

28. A support structure according to claim 1, wherein said separate air conditioner parts include a heater core, an evaporator and dampers for controlling air flow from said fan unit to said heater core and said evaporator support in said opening.

* * * * *